(12) United States Patent
Ichikawa et al.

(10) Patent No.: US 9,997,759 B2
(45) Date of Patent: Jun. 12, 2018

(54) BATTERY WIRING MODULE

(71) Applicant: Yazaki Corporation, Minato-ku, Tokyo (JP)

(72) Inventors: Yoshiaki Ichikawa, Kakegawa (JP); Hirotaka Mukasa, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 67 days.

(21) Appl. No.: 14/968,123

(22) Filed: Dec. 14, 2015

(65) Prior Publication Data

US 2016/0172652 A1 Jun. 16, 2016

(30) Foreign Application Priority Data

Dec. 15, 2014 (JP) .................................. 2014-253436

(51) Int. Cl.
  *H01M 2/20* (2006.01)
(52) U.S. Cl.
  CPC ........ *H01M 2/206* (2013.01); *H01M 2220/20* (2013.01)
(58) Field of Classification Search
  None
  See application file for complete search history.

(56) References Cited

U.S. PATENT DOCUMENTS

| 6,146,788 A * | 11/2000 | Ikeda .................... H01M 2/206 429/121 |
| 2014/0295225 A1* | 10/2014 | Okamoto .............. H01M 2/206 429/65 |

FOREIGN PATENT DOCUMENTS

| JP | 2010-114025 A | 5/2010 | |
| JP | WO 2013061787 A1 * | 5/2013 | ............ H01M 2/206 |

* cited by examiner

*Primary Examiner* — Wojciech Haske
(74) *Attorney, Agent, or Firm* — Sughrue Mion, PLLC

(57) ABSTRACT

A battery wiring module is to be combined with a battery module including a plurality of battery cells stacked in a state of being alternatively reversed so that a positive electrode terminal and a negative electrode terminal are adjoined between the adjacent battery cells. The battery wiring module is provided with a plurality of linear conductors which are arranged at an interval, a plurality of bus bars which are arranged at an interval along to at least one side of the plurality of linear conductors so that each of the plurality of bus bars electrically connects the positive electrode terminal and the negative electrode terminal adjacent to each other, and
an insulation resin part including both a covering part for covering an outer periphery of the plurality of linear conductors and a bus bar connection part.

9 Claims, 11 Drawing Sheets

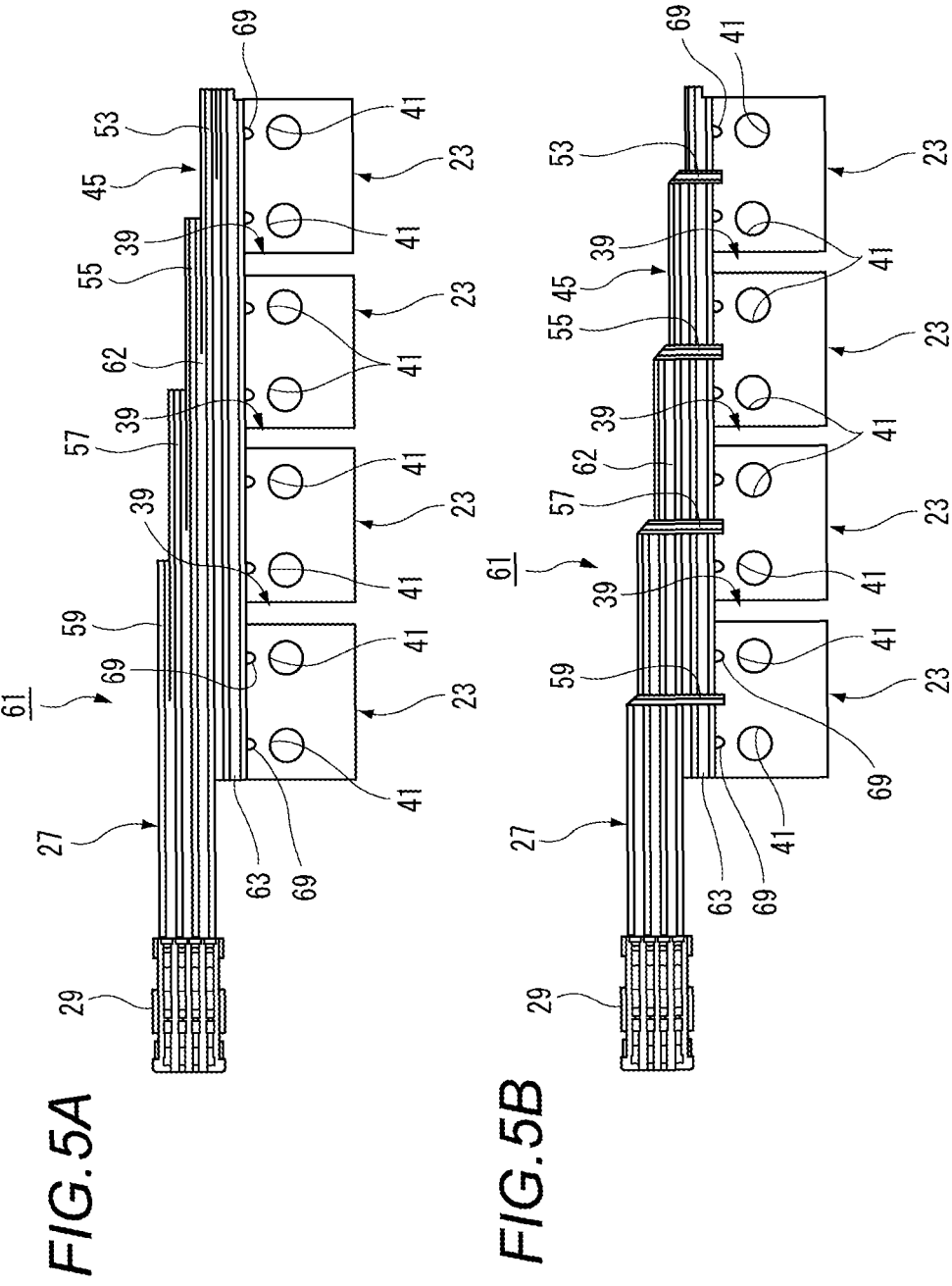

BATTERY WIRING MODULE

CROSS REFERENCE TO RELATED APPLICATIONS

This application claims priority from Japanese Patent Application No. 2014-253436 filed on Dec. 15, 2014, the entire contents of which are incorporated herein by reference.

BACKGROUND OF THE INVENTION

Field of the Invention

The present invention relates to a manufacturing method for a battery wiring module.

Related Art

In an in-vehicle battery pack to be connected to a power converter for driving a motor in a vehicle such as a hybrid car or an electric car, a battery module is configured that many battery cells are laminated in a manner of being alternatively reversed so that a positive electrode terminal and a negative electrode terminal are adjoined between the adjacent battery cells. Then, the electrode terminals of the adjacent battery cells are connected by a connection member such as a bus bar or the like, and thus a plurality of the battery cells are connected in series or in parallel.

In a case of assembling the battery module of the aforesaid configuration, it is necessary to connect between the electrode terminals via the respective connection members at plural portions. In view of this, a bus bar module is employed. The bus bar module is formed in a manner that a plurality of the connection members, arranged within a die according to the number of spaces among the electrode terminals to be connected, are integrally molded within insulation resin using an insert molding or the like.

In a case of connecting a plurality of the battery cells in series or in parallel, if battery characteristic such as a battery voltage is not uniform among the battery cells, degradation or breakage of the battery may be caused. Thus, in the in-vehicle battery pack, in order to stop charging or discharging before an abnormality occurs in a voltage between the respective battery cells, each of the bus bars is provided with a voltage detection wire for detecting a voltage of the corresponding battery cell.

In a bus bar module of a related art, the voltage detection wire adopts a configuration that a tip of a covered wire is peeled to expose a core wire, then a round terminal is crimped to the core wire, then the round terminal is fitted to an electrode terminal of a battery cell, and the round terminal is jointly fastened to the electrode terminal together with the connection member by a nut.

However, such the bus bar module has a problem that if the number of the voltage detection wires is large, an entire thickness of these wires becomes large and hence these wires are less likely bent. Also, as these wires are heavy as a whole, a wiring work of these wires becomes difficult. Further, the bus bar serving as the connection member is fitted to the positive and negative electrode terminals protruded from the battery cell. Also the round terminal crimped to the voltage detection wire is fitted to the electrode terminal and is jointly fastened to the electrode terminal together with the connection member by a nut. Thus, there arises a problem that a resistance value of a contact face between the bus bar and the round terminal becomes large to thereby cause a voltage drop therebetween.

In view of this, there has been proposed a high-voltage detection module device (bus bar module) for a battery pack which can easily wire to respective battery cells with a simple structure, and cause no voltage drop (for example, see a patent literature 1).

In this high-voltage detection module device for the battery pack, a plurality of bus bars are arranged at an insulation frame body combined with a battery pack body in a state of connecting prescribed positive and negative electrode terminals of the battery cell, then a flat cable is disposed in a region of the insulation frame body except this arrangement region, and conductive wires, separated by making notches in a specified shape between the respective conductive wires of this flat cable while leaving roots, are welded to the predetermined bus bars, respectively.

As the high-voltage detection module device for the battery pack thus configured is constituted of the insulation frame body, the plurality of bus bars and the flat cable, this device can be configured by a simple structure. Further, the high-voltage detection module device can be configured by simple works of arranging the bus bars at the insulation frame body, separating the respective conductive wires from the flat cable, and welding the conductive wires to the respective bus bars.

PRIOR ART LITERATURE

Patent Literature

[Patent Literature 1] JP-A-2010-114025

However, the insulation frame body of the high-voltage detection module device of the patent literature 1 has a rectangular plate shape in a plan view, and is configured to have a plurality of protrusions arranged on a lower surface thereof with a predetermined space, and a plurality of through holes opened with a predetermined interval at the plate-shaped part. That is, each of the predetermined space and the number of the plurality of protrusions to be fitted into gaps among the respective battery cells is required to be changed depending on a size of the battery cell. Further, each of the predetermined interval and the number of the plurality of through holes opened with the same interval as that between the positive and negative electrode terminals of the battery cell is required to be changed depending on the size of the battery cell. Thus, the insulation frame body is a dedicated component for every kinds of the battery pack. As a result, this high-voltage detection module device has a low versatility and hence reduction of a manufacturing cost thereof is difficult.

SUMMARY OF THE INVENTION

One or more embodiments of the invention provide a manufacturing method for a battery wiring module which can easily perform wiring to respective battery cells with simple configuration, and also can improve versatility and reduce a manufacturing cost.

In an aspect (1), one or more embodiments provide a battery wiring module to be combined with a battery module including a plurality of battery cells stacked in a state of being alternatively reversed so that a positive electrode terminal and a negative electrode terminal are adjoined between the adjacent battery cells. The battery wiring module is comprising:

a plurality of linear conductors which are arranged at an interval;

a plurality of bus bars which are arranged in parallel at an interval along to at least one side of the plurality of linear conductors so that each of the plurality of bus bars electrically connects the positive electrode terminal and the negative electrode terminal adjacent to each other; and an insulation resin part including both a covering part for covering an outer periphery of the plurality of linear conductors and a bus bar connection part, wherein the bus bar connection part is hot pressed so as to cover at least a part of each of through holes formed in side edges of the plurality of bus bar, wherein the side edges are adjacent to the plurality of linear conductors, and wherein each of the plurality of linear conductors is electrically connected to predetermined one of the plurality of bus bars.

According to the aspect (1), each of the plurality of bus bars has the through hole, for flowing resin therein, formed in each of the side edges of the bus bars adjacent to the linear conductors. The covering part of the insulation resin part covers the outer periphery of the linear conductors. The bus bar connection part of the insulation resin part is hot pressed so as to cover at least a part of each of the through holes formed in the respective side edges adjacent to the linear conductors in the bus bars. The bus bar connection part is welded to the side edge of the bus bar by the hot press and, simultaneously, a softened portion of the bus bar connection part penetrates the through hole and solidifies. The softened resin thus solidified acts as a pillar body to couple between the bus bar connection part on the front and rear surface sides of the bus bar. Thus, the plurality of bus bars coupled via the insulation resin part are integrally arranged with the predetermined interval along the plurality of linear conductors.

Accordingly, an insulation member such as an insulation frame body for arranging the plurality of bus bars in the battery module can be eliminated, without degrading mounting workability at a time of assembling the battery wiring module with the battery module. Further, as it is not necessary to prepare the insulation members as dedicated components for every kinds of the battery pack, versatility of the battery wiring module can be improved and a manufacturing cost thereof can be reduced.

In an aspect (2), one or more embodiments provide the battery wiring module, wherein the bus bar connection part is hot pressed from both flat surface sides toward the side edges of the bus bars.

According to the aspect (2), the bus bar connection part before the hot press is formed to have a U-shape in its sectional view along a thickness direction. The side edge of the bus bar is positioned in a manner that at least a part of the through hole is covered by the bus bar connection part in a case that the side edge is inserted into an end face recess of the bus bar connection part. Thus, a temporal assembling of each of the bus bars with respect to the bus bar connection part before the hot press can be performed simply and with a high accuracy. Further, as the softened resin is welded to the front and rear surface sides of the bus bar, a joining area between the bus bar and the bus bar connection part can be made large and hence a fixing intensity can be improved.

In an aspect (3), one or more embodiments provide the battery wiring module, wherein the bus bar connection part is hot pressed so as to cover a part of each of the through holes.

According to the aspect (3), the bus bar connection part is hot pressed so as to cover a part of the through hole. Thus in a case that the bus bar connection part is welded to the side edge of the bus bar by the hot press, the softened resin on the front and rear surface sides of the bus bar does not close the through hole tightly. As a result, there does not arise such a phenomenon that air is filled in the through hole as a sealed space to thereby prevent the softened resin flowing into the through hole.

In an aspect (4), one or more embodiments provide the battery wiring module, wherein each of the through holes includes a communication part communicating with an edge of the bus bar.

According to the aspect (4), the through hole is opened at the edge of the bus bar via the communication part. Thus, even if each of the front and rear surface sides of the bus bar is covered by the softened resin, there does not arise such a phenomenon that air is filled in the through hole to thereby prevent the softened resin flowing into the through hole. As a result, a pillar body for coupling the bus bar connection part on the front and rear surface sides of the bus bar can be surely formed in the through hole.

In an aspect (5), one or more embodiments provide the battery wiring module, wherein the bus bar connection part is hot pressed from one flat surface side toward the side edges of the bus bars.

According to the aspect (5), the bus bar connection part, subjected to the hot press from the one flat surface side thereof against the side edge of the bus bar, can be formed as a single layer structure of a rectangular shape in its section in a thickness direction. That is, the bus bar connection part before the hot press is not required to be provided with the end face recess for receiving the side edge of the bus bar. Thus the bus bar connection part can be configured to have simple structure.

Further, the bus bar connection part is subjected to the hot press from the one surface side thereof against the side edge of the bus bar. Thus, when the bus bar connection part is welded to the side edge of the bus bar by the hot press, air is prevented from being sealed within the through hole by the softened resin. As a result, there does not arise such a phenomenon that air is filled in the through hole to thereby prevent the softened resin flowing into the through hole

ADVANTAGE OF THE INVENTION

According to the battery wiring module according to the invention, wiring to the respective battery cells can be performed easily with simple configuration, and also versatility can be improved and a manufacturing cost can be reduced As described above, the invention is explained briefly. Further, details of the invention will be more clarified by thoroughly reading, with reference to accompanying drawings, modes for carrying out the invention (hereinafter referred to "embodiments") explained below.

BRIEF DESCRIPTION OF THE DRAWINGS

FIGS. 5A and 5B are plan views of conductor connection structure according to a modified example of the battery wiring module shown in FIG. 1.

DETAILED DESCRIPTION OF THE EMBODIMENTS

Hereinafter, embodiments according to the invention will be exclaimed with reference to drawings.

Figure 1:
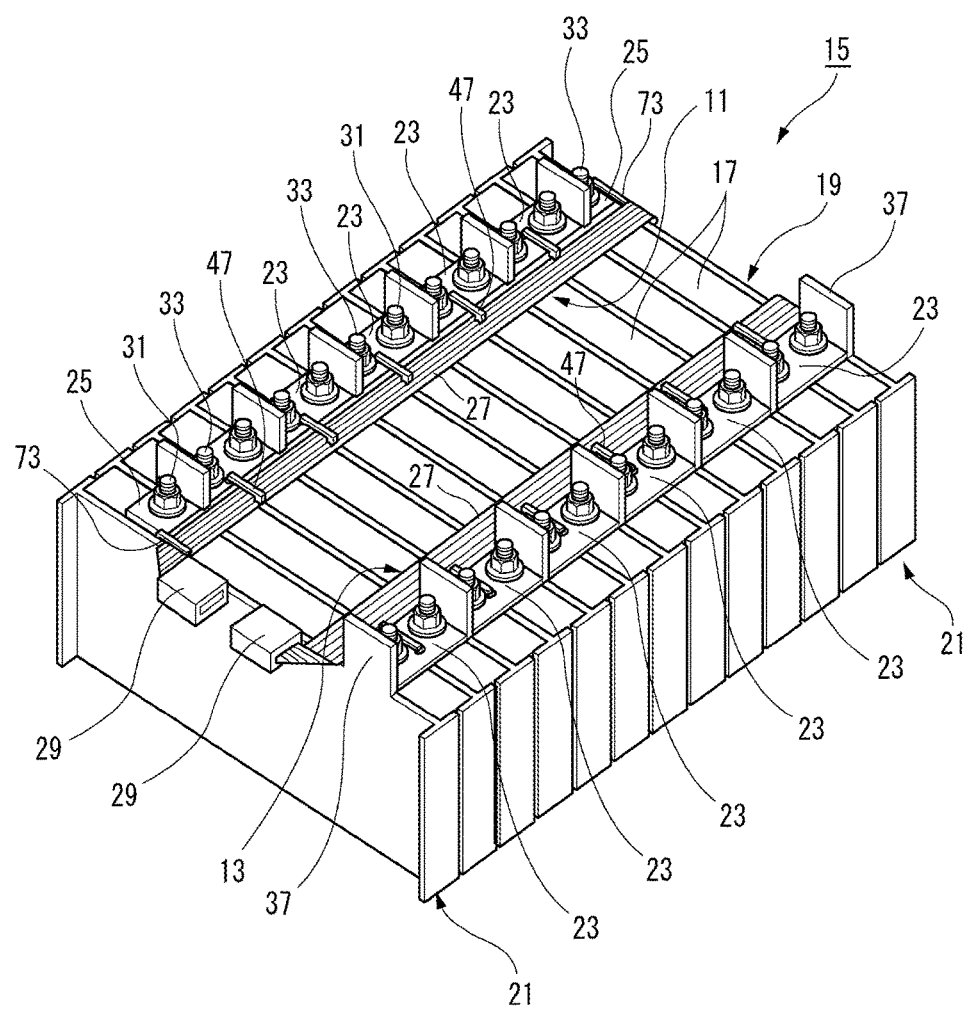
FIG. 1 is an entire perspective view of a battery pack combined with battery wiring modules according to a first embodiment.

As shown in FIG. 1, a battery pack 15 configured by combining battery wiring modules 11, 13 according to a first embodiment of the invention is used as a driving source for, for example, an electric car or a hybrid car or the like. The battery pack includes a battery module 19 having a plurality of battery cells 17 arranged in a side-by-side manner. The battery module 19 is configured in a manner that the plurality of battery cells 17 are arranged and fixed via separators 21 therebetween within a not-shown box-shaped casing.

The battery wiring modules 11, 13 according to the first embodiment are constituted of a plurality of bus bars 23, 25 which connect the plurality of battery cells 17 in series, voltage detection wires 27 for measuring voltages of the respective battery cells 17, and connectors 29 connected to one ends of the respective voltage detection wires 27.

Figure 2:
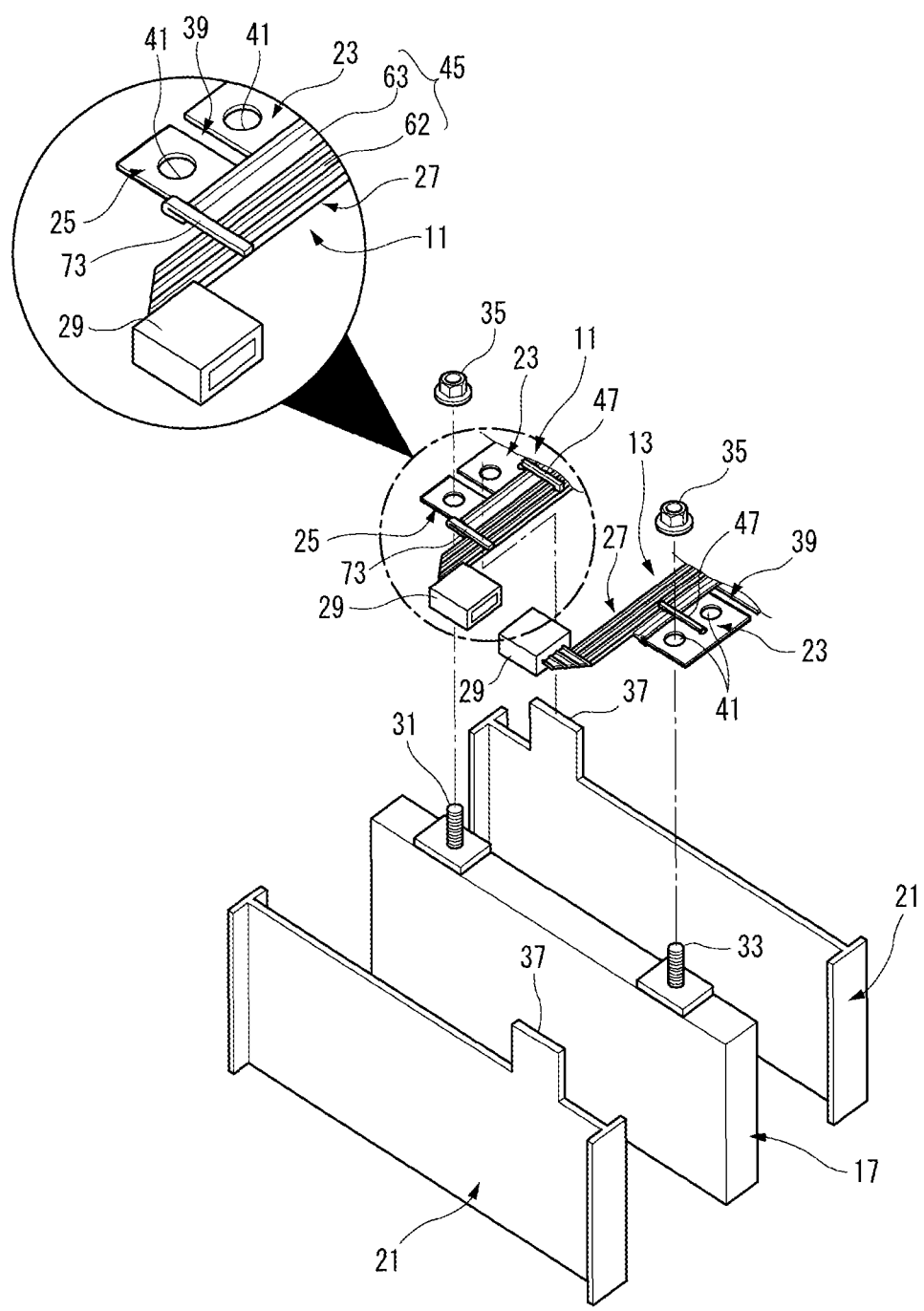
FIG. 2 is an exploded perspective view of a main part of the battery pack shown in FIG. 1.
Figure 3:
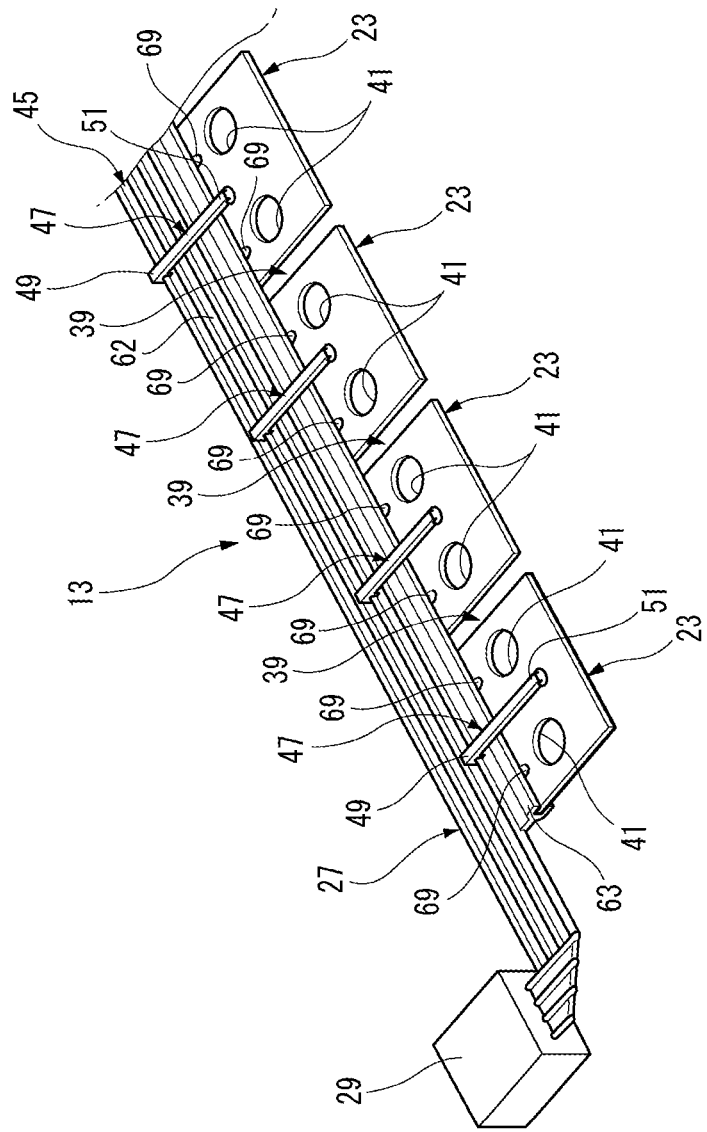
FIG. 3 is a partial plan view of the battery wiring module shown in FIG. 1.

Each of the battery cells 17 is a secondary battery, and has a positive electrode terminal 31 and a negative electrode terminal 33 each protruding from an upper surface thereof as shown in FIG. 2. In a case of disposing the battery cells within the casing, as shown in FIG. 1, the battery cells 17 are laminated in a manner of being alternatively reversed so that the positive electrode terminal 31 and the negative electrode terminal 33 are adjoined between the adjacent battery cells. These positive electrode terminal 31 and negative electrode terminal 33 of the battery cell are fastened by nuts 15 via the bus bars 23, 25, respectively.

The separators 21 made of insulation resin shown in FIG. 2 are disposed at both sides of an adjacent pair of the battery cells 17 or each of the battery cells. A partition part 37 protruding upward than an upper surface of the battery cell 17 is formed at an upper end of the separator 21. The partition part 37 is disposed in a slit (space) 39 formed between the adjacent bus bars 23, 25, thus preventing short-circuit between the electrode terminals due to a tool.

As shown in FIG. 1, the battery wiring modules 11 and 13 each having a belt-shape are disposed on the plurality of battery cells 17 along an arrangement direction of the battery cells 17.

The battery wiring modules 11 and 13 are disposed in two rows along the arrangement direction of the battery cells 17. In the battery wiring modules 11 and 13, a plurality of the bus bars 23, 25 are arranged in two row on the positive electrode terminals 31 and the negative electrode terminals 33 that are arranged alternatively along the arrangement direction of the battery cells 17. Further, the voltage detection wires 27 are arranged in parallel on the inner sides of the respective bus bar rows constituted by the bus bars 23, 25.

The bus bars 23, 25 constituting each of the battery wiring modules 11 and 13 are configured that terminal through holes 41 for passing and connecting the positive electrode terminals 31 and the negative electrode terminals 33 are arranged in one row. In the left upper side bus bar row among the two bus bar rows shown in FIG. 1, the bus bar 25 having a single hole constituted of the terminal through hole 41 is disposed at each of both ends of this bus bar row, and the bus bar 23 having two holes constituted of the two terminal through holes 41 is provided five between the two bus bars 25 each having the single hole disposed at the both ends. In contrast, in the right lower side bus bar row among the two bus bar rows shown in FIG. 1, the bus bar 23 having two holes are provided six.

As shown in FIG. 2, each of the bus bars 23, 25 has an almost rectangular shape. In each of the bus bars 23, the terminal through holes 41 for passing and connecting the positive electrode terminals 31 and the negative electrode terminals 33 are formed, respectively. Further, in a pair of the bus bars 25, the terminal through holes 41 for passing the positive and negative electrode terminals 31, 33 therethrough are formed, respectively. The bus bars 23, 25 are formed, in a press process in advance, by punching out a metal plate made of copper, copper alloy, aluminum, aluminum alloy, gold, stainless steel (SUS) or the like. Each of the bus bars 23, 25 may be subjected to a plating treatment using Sn, Ni, Ag, Au or the like in order to improve welding property.

Incidentally, each of the bus bars 23, 25 according to the embodiment is electrically connected to the respective electrode terminals by screwing and fastening the nuts 35 on the positive electrode terminal 31 and the negative electrode terminal 33 passing the respective terminal through holes 41. Of course, each of the bus bars 23 according to the invention may be electrically connected to the positive and negative electrode terminals 31, 33 by being welded to the respective electrode terminals, without forming the terminal through holes 41.

The voltage detection wire 27 constituting each of the battery wiring modules 11 and 13 is formed in a manner that an outer periphery of a plurality of linear conductors 43 (see FIG. 4) arranged in parallel with a predetermined space is covered by an insulation resin part 45 (insulation resin such as polypropylene (PP), polyvinyl chloride (PVC), polybutylene terephthalate (PBT), polyethylene terephthalate (PET)) and thus formed in a flat cable shape. As the linear conductor 43 according to the invention, various kinds of conductor such as a single wire of a flat conductor or a round conductor or a twisted wire may be used.

Each of the bus bars 23 of the battery wiring modules 11, 13 electrically connects between the positive electrode terminal 31 and the negative electrode terminal 33 adjacent to each other, and is electrically connected to corresponding one of the linear conductors 43 of the voltage detection wire 27 for measuring a voltage of the corresponding battery cell 17.

Figure 4:
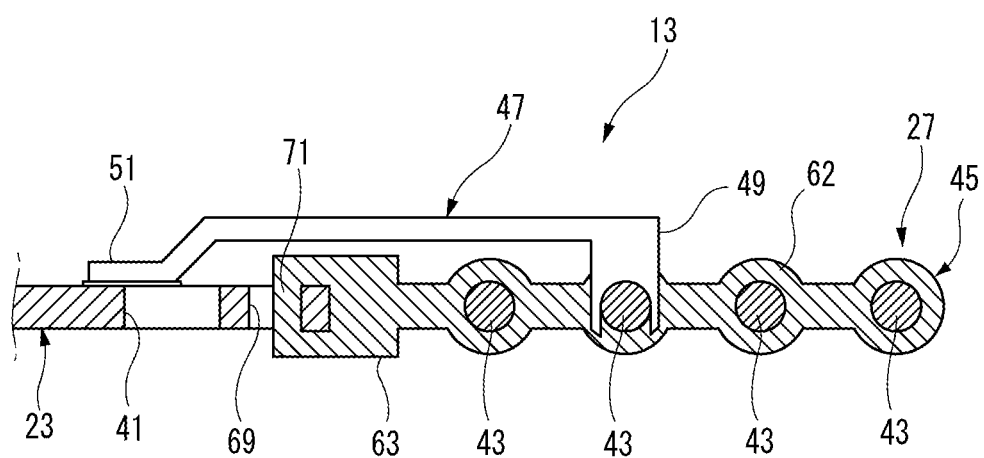
FIG. 4 is a sectional view of a main part of the battery wiring module showing connection structure between a linear conductor and a bus bar.

In this embodiment, as shown in FIG. 4, each of the bus bars 23 is connected to corresponding one of the linear conductors 43 of the voltage detection wire 27 via a connection member 47. The connection member 47 is formed by stamping out a metal plate so as to have a pressure welding blade 49 at one end of a body thereof and a welding part 51 at the other end of the body. Then, the pressure welding blade 49 of the connection member 47 is connected by pressure welding to the predetermined linear conductor 43, whilst the welding part 51 is connected by welding to the predetermined bus bar 23. Incidentally, the "connection by welding" in this embodiment includes various kinds of known welding connection such as spot welding, ultrasonic welding and laser welding. Further, the connection member 47 according to the invention is not limited to the connection member 47 of this embodiment having the pressure welding blade 49 at the one end, but may be various kinds of member such as a wire or a bus bar based on the gist of the invention.

Incidentally, the bus bar 23 can be connected to the linear conductor 43 without using the connection member 47. That is, as shown in FIG. 5A, respective end parts 53, 55, 57 and 59 as one ends of the plurality of linear conductors 43 of the voltage detection wire 27 arranged in parallel to the four bus bars 23 are formed in a staircase pattern rising to the left side from the right side. Specifically, the end part of the linear conductor 43 on the nearest side has the longest size, whilst the end part of the linear conductor 43 on the most rear side has the shortest size.

Next, as shown in FIG. 5B, in a connection process, the end parts 53, 55, 57 and 59 of the plurality of linear conductors 43 covered by the insulation resin part 45 are separated from one another while remaining the other ends thereof. Then, each of the end parts 53, 55, 57 and 59 is bent substantially orthogonally toward corresponding one of the bus bars 23 and connected to the corresponding bus bar 23 by welding.

Thereafter, a battery wiring module 61 is completed by connecting the connector 29 to one end of the voltage detection wire 27.

In this manner, according to the battery wiring module 61 according to a modified example of the embodiment, the bus bar 23 can be electrically connected to the predetermined linear conductor 43 by the simple work of separating the insulation resin part 45 among the respective linear conductors 43 and then welding the end parts 53, 55, 57 and 59 of the linear conductors 43 to the respective bus bars 23.

As shown in FIG. 1, in the battery wiring module 11 according to the first embodiment, the plurality of bus bars 23, 25 are arranged in parallel along at least one side of the linear conductors 43. Further, in the battery wiring module 13, the plurality of bus bars 23 are arranged in parallel along at least one side of the linear conductors 43.

Figure 6A:
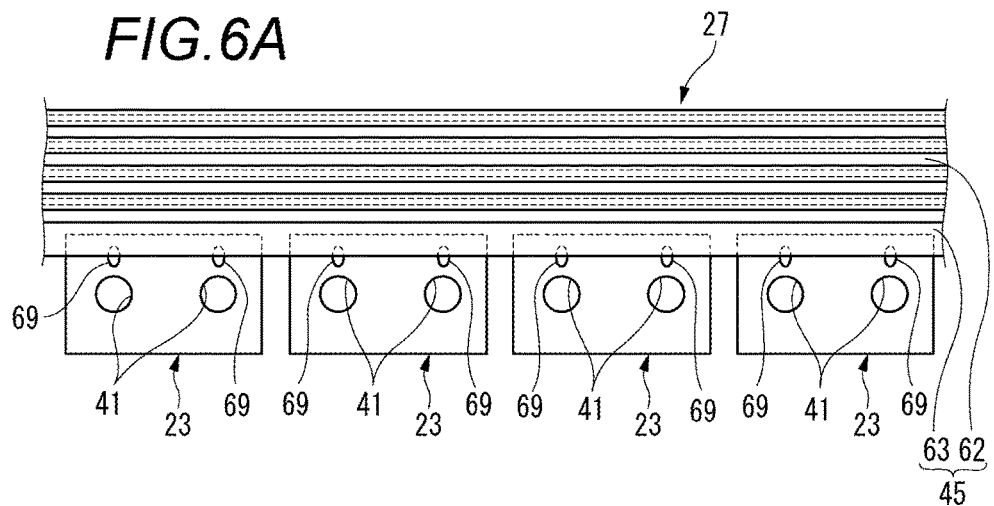
FIG. 6A is a plan view of a main part of the battery wiring module.
Figure 6B:
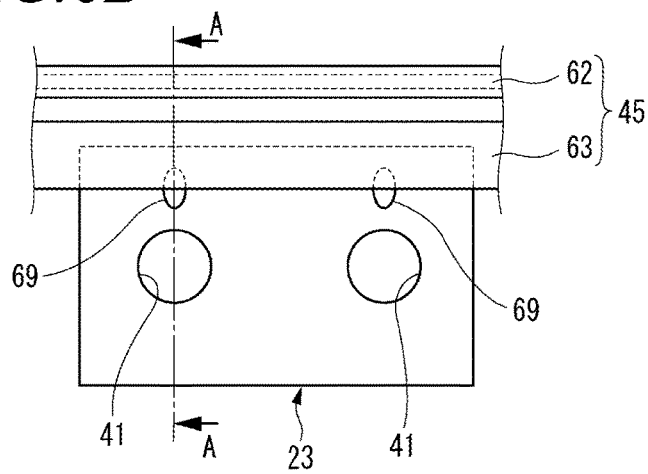
FIG. 6B is an enlarged view of the main part of FIG. 6A
Figure 6C:
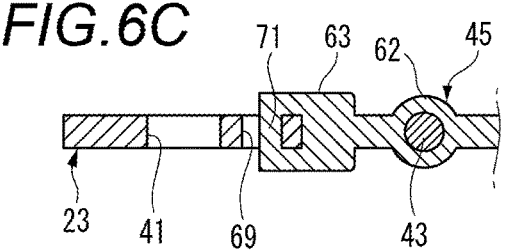
FIG. 6C is a sectional view of the main part taken along line A-A in FIG. 6B.

As shown in FIGS. 6 and 7, the insulation resin part 45 of the voltage detection wire 27 includes a bus bar connection part 63 for coupling the bus bars 23, 25 by hot press and a covering part 62 for covering the outer periphery of the plurality of linear conductors 43. In the first embodiment, the bus bar connection part 63 before the hot press is formed to have a U-shape in its sectional view along a thickness direction. A side edge 67 of the bus bar 23 is inserted into a U-shaped end face recess 65 (see FIGS. 7A and 7B) of the bus bar connection part 63, and the bus bar connection part is subjected to the hot press. In other words, the bus bar connection part 63 is subjected to the hot press against both flat surface sides thereof toward the side edges 67 of the bus bars 23 (see FIG. 7C).

Through holes 69 each having an elliptical shape are perforated in the bus bars 23, 25 according to the first embodiment. Each of the bus bars 23 is provided with the two through holes 69 in correspondence to the two terminal through holes 41. Incidentally, the number of the through hole 69 may be single or three or more. Further, the opening shape of the through hole 69 is not limited to an ellipse but may be various kinds of shape such as a circle or a polygon. The through hole 69 is disposed on the linear conductor 43 side than the terminal through hole 41. That is, the through hole 69 is formed in the side edge 67 of the bus bar 23 adjacent to the linear conductor 43. Then the bus bar connection part 63 is subjected to the hot press so as to cover a part of the through hole 69. The bus bar connection part 63 is welded to the side edge 67 of the bus bar 23 by the hot press and, simultaneously, a softened portion of the bus bar connection part penetrates the through hole 69 and solidifies. The softened resin thus solidified acts as a pillar body 71 to couple between the bus bar connection part 63 on the front and rear surface sides of the bus bar.

The bus bar 25 having the single hole is electrically connected to the positive electrode terminal 31 or the negative electrode terminal 33, and also electrically connected to corresponding one of the linear conductors 43 of the voltage detection wire 27 for measuring a voltage of the corresponding battery cell 17.

The bus bar 25 according to the first embodiment is connected to the corresponding one of the linear conductors 43 of the voltage detection wire 27 via a cut and raised piece 73 formed at a side edge of the bus bar 25. The cut and raised piece 73 is formed by being bent along the side edge of the bus bar 25, and a tip of this piece is connected to the predetermined linear conductor 43 by welding (see FIG. 2). The predetermined linear conductor 43, to which the tip of the cut and raised piece is welded, can be selected by suitably changing the bent position of the cut and raised piece 73 to thereby change a protruded position of the tip. Alternatively, in a case of welding an intermediate portion of this cut and raised piece to the predetermined linear conductor, the predetermined linear conductor 43 can be selected by suitably changing the welding position of this piece without changing the bent position.

Next, a method of fabricating the battery wiring modules 11, 13 having the aforesaid configuration will be explained. Incidentally, as each of the battery wiring modules 11, 13 is fabricated by substantially the same fabrication process, the fabrication method will be explained as to the battery wiring module 13 as an example.

FIGS. 7A to 7D are sectional views of the battery wiring module 13 shown in FIG. 1 for explaining the hot press process of this module.

Figure 7A:
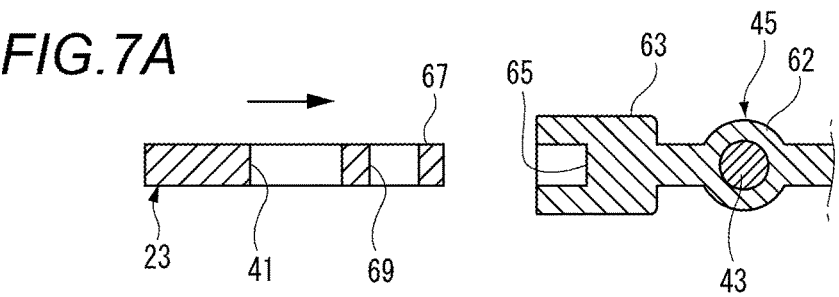
FIGS. 7A to 7D are sectional views of the main part for explaining a hot press process of the battery wiring module shown in FIG. 1.

In order to fabricate the battery wiring module 13 according to the first embodiment, firstly as shown FIG. 7A, the plurality of bus bars 23 are arranged in parallel with a predetermined interval along the one side of the plurality of linear conductors 43 which are arranged in parallel with the predetermined space.

Figure 7B:
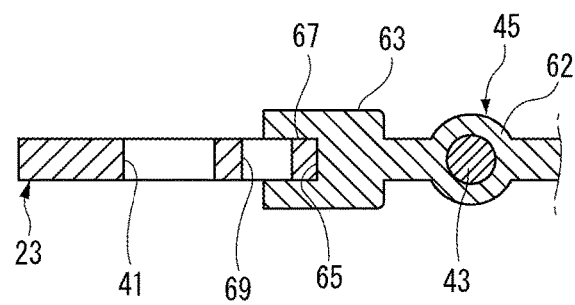

Next, as shown in FIG. 7B, the side edges 67 of the bus bars 23 are inserted into the end face recesses 65 of the bus bar connection part 63, respectively. In the bus bar 23 inserted into the end face recess 65, a part of the through hole 69 is opened without being covered by the bus bar connection part 63.

Figure 7C:
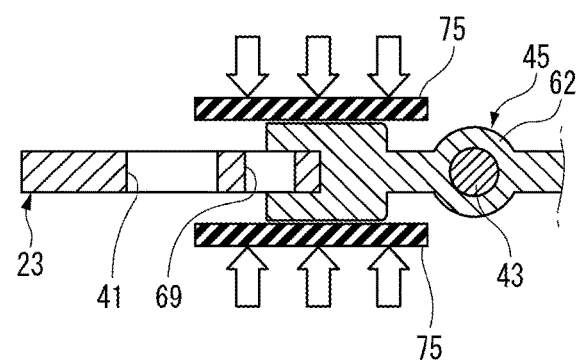

Next, as shown in FIG. 7C, the bus bar connection part 63 is sandwiched between a pair of hot press plates 75 in a manner of being pressed with a predetermined pressure in a thickness direction thereof. The bus bar connection part 63 heated by the hot press plates 75 is partially softened and flows into the through hole 69 by the pressing forces from the respective hot press plates 75. The softened resin flown into the through hole 69 solidifies to form the pillar body 71. In this case, the bus bar connection part 63 is hot-pressed so as to partially cover the through hole 69. Thus, as the through hole 69 is in an opened state, the softened resin is not prevented flowing into the through hole 69.

Figure 7D:
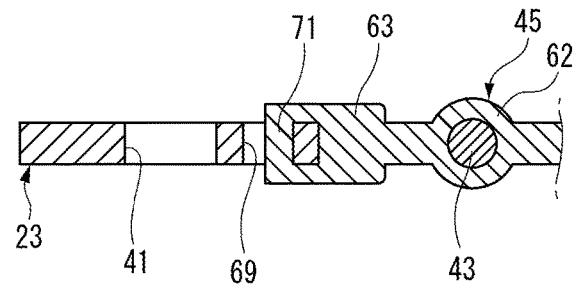

As shown in FIG. 7D, when the pillar body 71 solidifies, the bus bar connection part 63 on the front and rear surface sides of the bus bar is coupled via the pillar body 71 and engages with the through hole 69. Thus, the bus bar connection part 63 is fixed to the bus bar 23 with a high fixing strength, by means of both the adhesion that the softened resin is welded to the front and rear surface sides of the bus bar and the engagement structure that the pillar body 71 engages with the through hole 69.

By doing so, the long battery wiring module 13, in which the plurality of linear conductors 43 constituting the voltage detection wire 27 of the flat cable shape and the bus bars 23 are integrally arranged in parallel, is formed.

Incidentally, in the battery wiring module 13, the interval of the bus bars 23, a space between a pair of the terminal through holes 41 and an inner diameter of this through hole can be suitably changed according to a size or the like of the battery cell 17. By doing so, various kinds of the battery wiring module 13 different in specification can be formed.

Next, the plurality of linear conductors 43 are electrically connected to the predetermined bus bars 23 via the connection members 47, respectively. In each of the connection members 47, the pressure welding blade 49 formed at the one end of the body is connected to the predetermined linear conductor 43 by the pressure welding, and the welding part 51 formed at the other end of the body is connected by welding to the predetermined bus bar 23.

Then, the battery wiring module 13 is completed by connecting and fixing the connector 29 to the one end of the voltage detection wire 27.

The battery wiring modules 11, 13 configured in this manner are mounted on an upper surface of the battery module 19 in which the twelve battery cells 17 are arranged in the side-by-side manner so that the positive electrode terminal 31 and the negative electrode terminal 33 having the opposite polarities are adjoined between the adjacent battery cells.

Next, all the positive electrode terminals 31 and the negative electrode terminals 33 of the plurality of battery cells 17 arranged in the side-by-side manner are inserted into all the terminal through holes 41 of the bus bars 23, 25, respectively. Also the partition parts 37 of the separators 21 shown in FIG. 2 are inserted into the slits 39, respectively.

Then, the respective nuts 35 are screwed and fastened on the positive electrode terminals 31 and the negative electrode terminals 33 protruded from the terminal through holes 41. When all the positive electrode terminals 31 and the negative electrode terminals 33 are fastened by the respective nuts 35, the battery pack 15 shown in FIG. 1 in which the battery wiring modules 11 and 13 are mounted on the battery module 19 is completed.

Next, action of the aforesaid configuration will be explained.

In each of the battery wiring modules 11, 13 according to the first embodiment, both the outer periphery of the plurality of linear conductors 43 and the side edges 67 of the plurality of bus bars 23, 25 are integrally covered by the insulation resin part 45. Thus, the plurality of bus bars 23, 25 coupled via the insulation resin part 45 are integrally arranged with the predetermined interval along the plurality of linear conductors 43. By doing so, an insulation member such as an insulation frame body for arranging the plurality of bus bars 23, 25 in the battery module 19 can be eliminated, without degrading mounting workability at a time of assembling the battery wiring modules 11, 13 with the battery module 19. As a result, as it is not necessary to prepare the insulation members as dedicated components for every kinds of the battery pack 15, versatility of the battery wiring modules 11, 13 can be improved and a manufacturing cost thereof can be reduced.

Further, in the battery wiring module 11 according to the first embodiment, the tip of the cut and raised piece 73 formed by being bent at the side edge of the bus bar 25 is connected to the predetermined linear conductor 43 of the voltage detection wire 27 by welding. Thus, the bus bar 25 can be electrical connected to the predetermined linear conductor 43 by the simple work of welding the tip of the cut and raised piece 73 formed at the bus bar 25 to the predetermined linear conductor 43.

Further, in each of the battery wiring modules, 11, 13 according to the first embodiment, the pressure welding blade 49 formed at the one end of the connection member 47 is connected by the pressure welding to the predetermined one of the plurality of linear conductors 43 covered by the insulation resin part 45. Further, the welding part 51 formed at the other end of the connection member is connected by the welding to the predetermined bus bar 23.

In this manner, the predetermined linear conductor 43 and the bus bar 23 can be electrically connected by the simple works of connecting by the pressure welding the pressure welding blade 49 formed at the one end of the connection member 47 to the predetermined linear conductor 43 and also connecting by the welding the welding part 51 formed at the other end of the connection member 47 to the bus bar 23.

The plurality of bus bars 23, 25 coupled via the insulation resin part 45 are integrally arranged along the plurality of linear conductors 43. In the plurality of bus bars 23, 25, an interval of the slits, the space between the pair of the terminal through holes 41 passing the positive and negative electrode terminals 31, 33 and the inner diameter of this through hole can be suitably changed according to the size or the like of the battery cell 17. Thus, as the plurality of bus bars 23, 25 thus changed can be assembled easily depending on the size or the like of the battery cell, the battery wiring modules 11, 13 of a quite high versatility can be obtained.

In the battery wiring modules 11, 13 according to the first embodiment, each of the bus bars 23, 25 has the through holes 69, at the side edge 67 adjacent to the linear conductor 43, into which the resin is flown. The insulation resin part 45 integrally has the covering part 62 and the bus bar connection part 63. The covering part 62 of the insulation resin part 45 covers the outer periphery of the linear conductors 43. The bus bar connection part 63 of the insulation resin part 45 is subjected to the hot press so as to cover a part of each of the through holes 69 formed in the side edges 67 of the bus bars 23, 25 adjacent to the linear conductors 43.

The bus bar connection part 63 is welded to the side edges 67 of the bus bars 23 by the hot press and, simultaneously, a softened portion of the bus bar connection part penetrates the through holes 69 and solidifies. The softened resin thus solidified acts as the pillar bodies 71 to couple between the bus bar connection part 63 on the front and rear surface sides of the bus bars. Thus, the plurality of bus bars 23, 25 coupled via the insulation resin part 45 are integrally arranged with the predetermined interval along the plurality of linear conductors 43. By doing so, as the bus bar connection part 63 is welded to the side edges 67 of the bus bars 23, 25 and, simultaneously, the pillar bodies 71 engage with the respective through holes 69, the bus bar connection part is firmly fixed to the bus bars 23, 25.

Thus, the insulation member such as the insulation frame body for arranging the plurality of bus bars 23, 25 in the battery module 19 can be eliminated, without degrading mounting workability at a time of assembling the battery wiring modules 11, 13 with the battery module 19. Further, as it is not necessary to prepare the insulation members as dedicated components for every kinds of the battery pack 15, versatility of the battery wiring modules 11, 13 can be improved and a manufacturing cost thereof can be reduced.

In the plurality of bus bars 23, 25, the interval of the bus bars, the space between the pair of the terminal through holes 41 passing the positive and negative electrode terminals 31, 33 and the inner diameter of this through hole can be suitably changed according to the size or the like of the battery cell 17. Thus, as the plurality of bus bars 23, 25 thus changed can be assembled easily depending on the size or the like of the battery cell, the battery wiring modules 11, 13 of a quite high versatility can be obtained.

Further, the bus bar connection part 63 according to the first embodiment is subjected to the hot press so as to cover a part of the through hole 69. By employing this configuration, in a case that the bus bar connection part 63 is welded to the side edge 67 of the bus bar 23 by the hot press, the softened resin on the front and rear surface sides of the bus bar does not close the through hole 69 tightly. Thus, there does not arise such a phenomenon that air is filled in the through hole 69 as a sealed space to thereby prevent the softened resin flowing into the through hole 69. As a result, the pillar body 71 can be surely formed in the through hole 69.

Further, in the battery wiring modules 11, 13 according to the first embodiment, the bus bar connection part 63 is subjected to the hot press against both flat surface sides thereof toward the side edges 67 of the bus bars 23. Thus, the bus bar connection part 63 before the hot press is formed to have the U-shape in its sectional view along the thickness direction. Specifically, the end face recess 65 for receiving the side edge 67 of the bus bar 23 is formed in the bus bar connection part 63. The side edge 67 of the bus bar 23 is positioned in a manner that the through hole 69 is partially covered by the bus bar connection part in a case that the side edge is inserted into the end face recess 65 of the bus bar connection part 63. Thus, a temporal assembling of each of the bus bars 23, 25 with respect to the bus bar connection part 63 before the hot press can be performed simply and with a high accuracy. Further, as the softened resin is welded to the front and rear surface sides of the bus bar, a joining area between the bus bar 23, 25 and the bus bar connection part 63 can be made large and hence a fixing intensity can be improved.

Figure 8A:
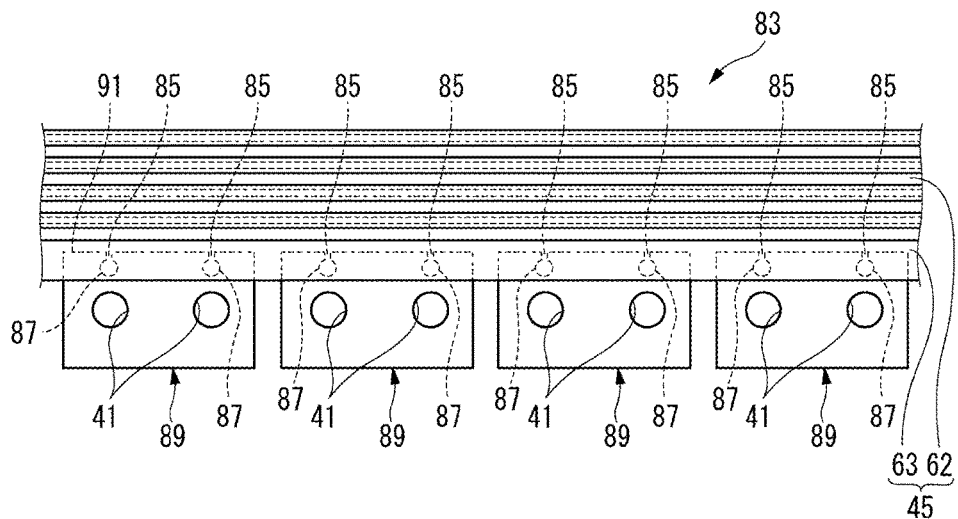
FIG. 8A is a plan view of a main part of a battery wiring module according to a second embodiment.
Figure 8B:
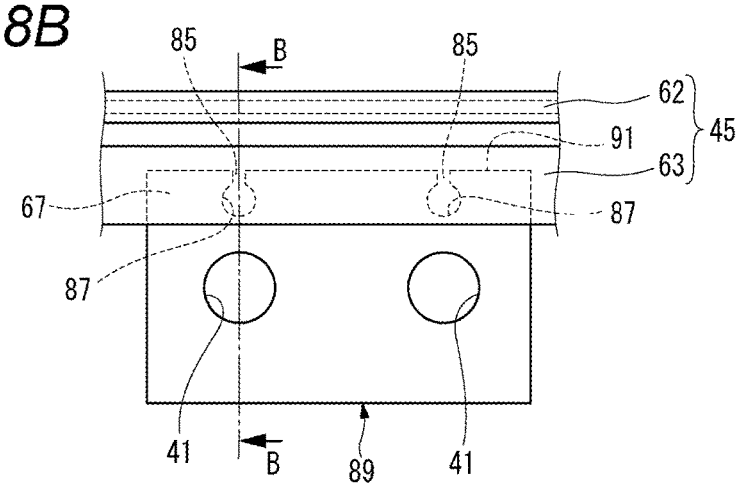
FIG. 8B is an enlarged view of the main part of FIG. 8A
Figure 8C:
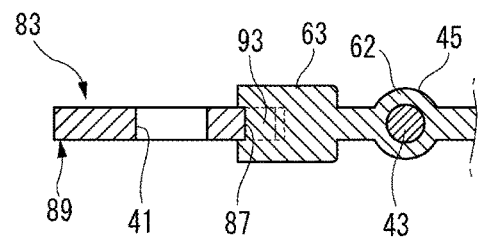
FIG. 8C is a sectional view of the main part taken along line B-B in FIG. 8B.

Next a battery wiring module 83 according to the second embodiment of the invention will be explained. Incidentally, in the explanation of the second embodiment, portions substantially identical to those of the battery wiring module 13 according to the first embodiment are referred to by the common symbols, with overlapped explanation thereof being omitted. As shown in FIGS. 8 and 9, in the battery wiring module 83 according to the second embodiment, a through hole 87 formed in a side edge of a bus bar 89 adjacent to linear conductors 43 has a communication part 85 communicating with an edge 91 of the bus bar 89. A bus bar connection part 63 is formed to have an end face recesses 65 like the first embodiment.

Figure 9A:
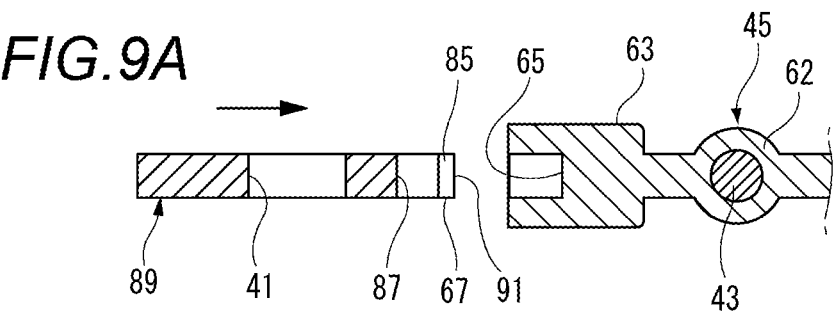
FIGS. 9A to 9D are sectional views of the main part for explaining a hot press process of the battery wiring module shown in FIG. 8.

In a case of fabricating the battery wiring module 83 according to the second embodiment, firstly as shown in FIG. 9A, the plurality of bus bars 89 are arranged in parallel with a predetermined interval along one side of the plurality of linear conductors 43 which are arranged in parallel with a predetermined space.

Figure 9B:
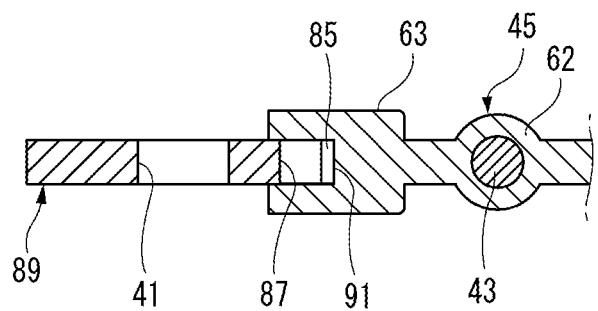

Next, as shown in FIG. 9B, side edges 67 of the bus bars 89 are inserted into the end face recesses 65 of the bus bar connection part 63, respectively. In the bus bar 89 inserted into the end face recess 65, the through hole 87 is entirely inserted within the end face recess 65 and covered by the bus bar connection part 63.

Figure 9C:
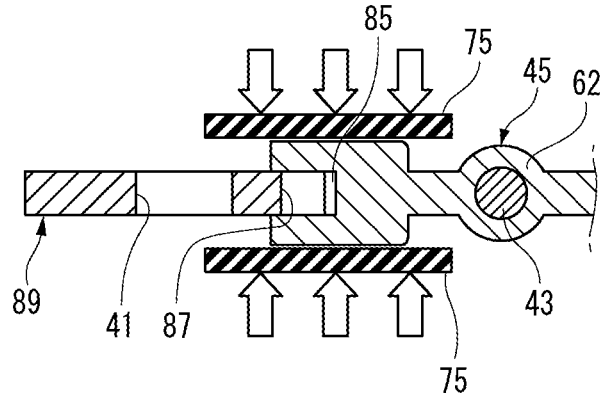

Next, as shown in FIG. 9C, the bus bar connection part 63 is sandwiched between a pair of hot press plates 75 in a manner of being pressed with a predetermined pressure in a thickness direction thereof. The bus bar connection part 63 heated by the hot press plates 75 is partially softened and flows into the through hole 87 by the pressing force from the respective hot press plates 75. The softened resin flown into the through hole 87 solidifies to form a pillar body 93. In this case, the through hole 87 is opened at the edge 91 of the bus bar 89 via the communication part 85. Thus, even if each of the front and rear surface sides of the bus bar is covered by the softened resin, there does not arise such a phenomenon that air is filled in the through hole 87 to thereby prevent the softened resin flowing into the through hole.

Figure 9D:
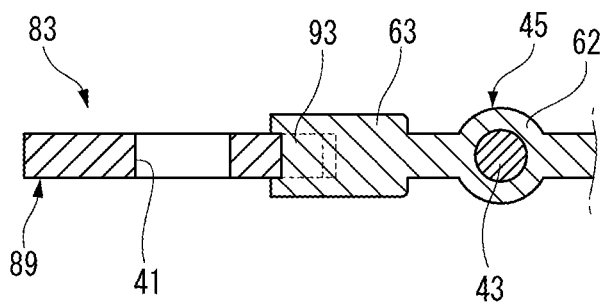

As shown in FIG. 9D, when the pillar body 93 solidifies, the bus bar connection part 63 on the front and rear surface sides of the bus bar is coupled via the pillar body 93 and engages with the through hole 87. Thus, the bus bar connection part 63 is fixed to the bus bar 89 with a high fixing strength, by means of both the adhesion that the softened resin is welded to the front and rear surface sides of the bus bar and the engagement structure that the pillar body 93 engages with the through hole 87.

According to this configuration, the long battery wiring module 83, in which the plurality of linear conductors 43 constituting a voltage detection wire 27 of a flat cable shape and the plurality of bus bars 89 are integrally arranged in parallel, is formed.

In the battery wiring module 83 according to the second embodiment, the through hole 87 is opened at the edge 91 of the bus bar 89 via the communication part 85. That is, the through hole 87 is not constituted as a hole having a closed inner periphery. As the through hole 87 is opened at the edge 91 of the bus bar 89 via the communication part 85, air within the through hole is exhausted via the communication part 85 even if the front and rear surfaces of the bus bar are covered by the adhered bus bar connection part 63 upon the hot press. Thus, even if the front and rear surfaces of the bus bar are covered at a portion of the through hole 87 by the softened resin, there does not arise such a phenomenon that air is filled in the through hole 87 to thereby prevent the softened resin flowing into the through hole. As a result, the pillar body 93 for coupling the bus bar connection part 63 on the front and rear surface sides of the bus bar can be surely formed in the through hole 87.

Next a battery wiring module 95 according to the third embodiment of the invention will be explained. Incidentally, in the explanation of the third embodiment, portions substantially identical to those of the first embodiment are referred to by the common symbols, with overlapped explanation thereof being omitted.

Figure 10A:
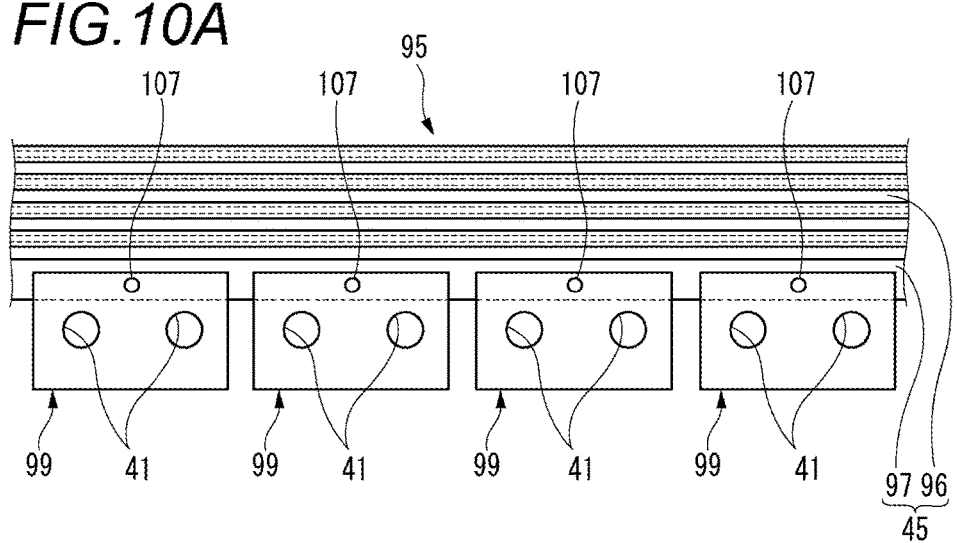
FIG. 10A is a plan view of a main part of a battery wiring module according to a third embodiment.
Figure 10B:
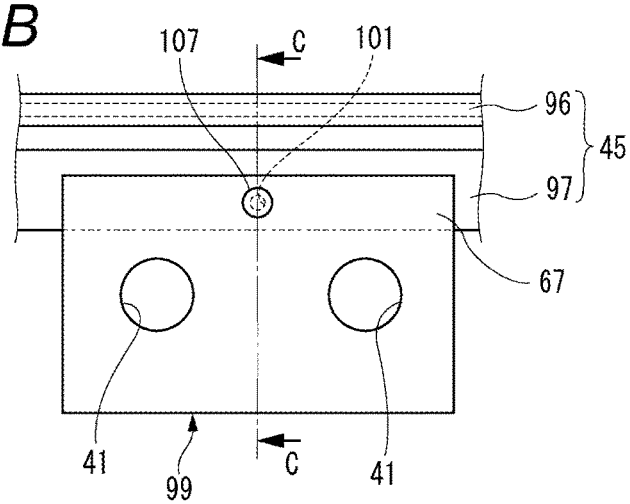
FIG. 10B is an enlarged view of the main part of FIG. 10A
Figure 10C:
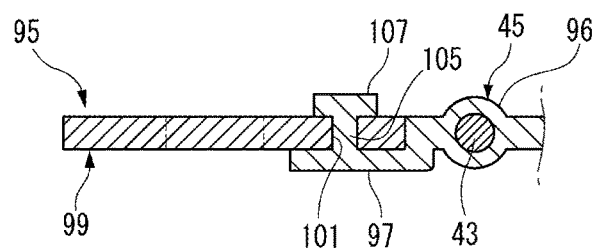
FIG. 10C is a sectional view of the main part taken along line C-C in FIG. 10B.
Figure 11A:
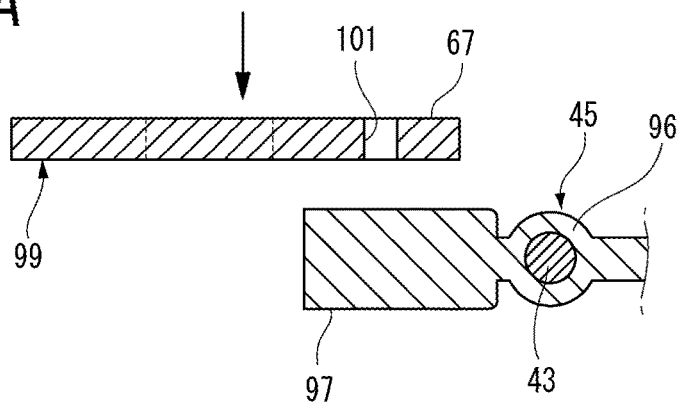
FIGS. 11A to 11C are sectional views of the main part for explaining a hot press process of the battery wiring module shown in FIG. 10.

As shown in FIGS. 10 and 11, in the battery wiring module 95 according to the third embodiment, a bus bar connection part 97 constituting an insulation resin part 45 together with a covering part 96 is subjected to the hot press toward a side edge 67 of a bus bar 99.from one flat surface side of the bus bar. Thus, the bus bar connection part 97 is configured to have a single layer structure of a rectangular shape in its section in a thickness direction. Further, a through hole 101 is formed as a circular hole having a closed inner periphery.

In a case of fabricating the battery wiring module 95 according to the third embodiment, firstly as shown in FIG. 10A, the plurality of bus bars 99 are arranged in parallel with a predetermined interval along one side of a plurality of linear conductors 43 which are arranged in parallel with a predetermined space. The bus bar 99 is arranged in a manner that one flat surface side (lower surface side in FIG. 11) thereof opposes one flat surface side (upper surface side in FIG. 11) of the bus bar connection part 97.

Figure 11B:
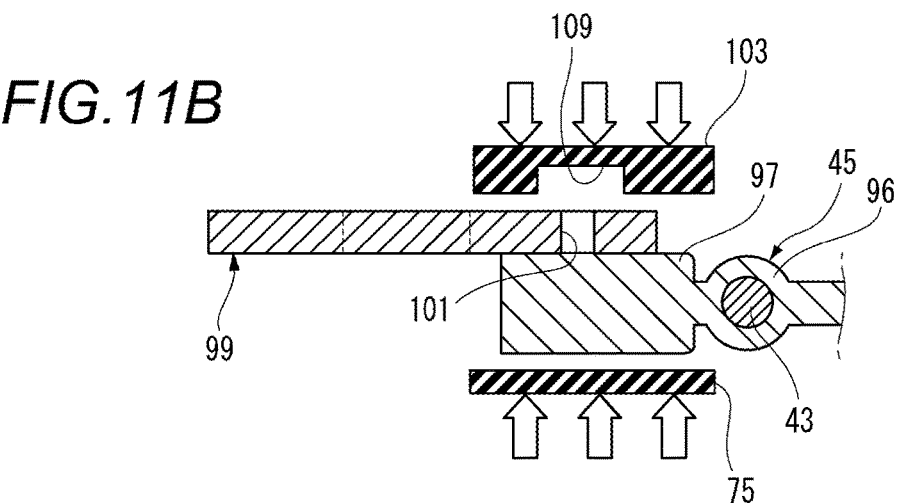

Next, as shown in FIG. 11B, the bus bar connection part 97 is sandwiched between a pair of hot press plates 75, 103 in a manner of being pressed with a predetermined pressure in a thickness direction thereof. The hot press plate 103 is provided with a recess 109 for molding a head 107 of a resin rivet 105 described later.

The bus bar connection part 97 heated by the hot press plate 75 is partially softened and flows into the through hole 101 from the one flat surface side of the bus bar 99 by the pressing forces from the respective hot press plates 75, 103. The softened resin flown into the through hole 101 is filled in the recess 109 of the hot press plate 103 to form the head 107 of the resin rivet 105.

Figure 11C:
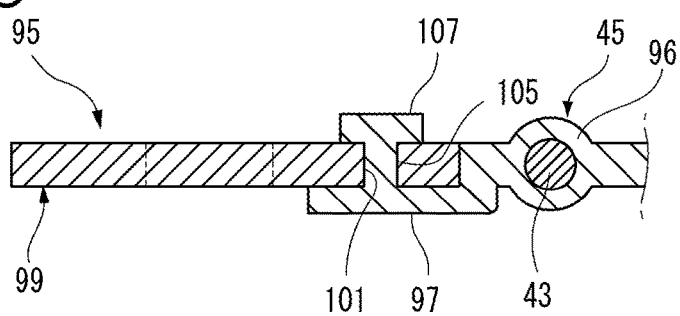

As shown in FIG. 11C, when the resin rivet 105 solidifies, the bus bar 99 is fixed to the bus bar connection part 97 via the resin rivet 105. Thus, the bus bar connection part 97 is fixed to the bus bar 99 with a high fixing strength, by means of both the adhesion that the softened resin is welded to the one flat surface side of the bus bar 99 and the engagement structure that the resin rivet 105 engages with the through hole 101.

According to this configuration, the long battery wiring module 95, in which the plurality of linear conductors 43 constituting a voltage detection wire 27 of a flat cable shape and the plurality of bus bars 99 are integrally arranged in parallel, is formed.

In the battery wiring module 95 according to the third embodiment, the bus bar connection part 97, subjected to the hot press from the one flat surface side thereof against the side edge 67 of the bus bar 99, can be formed as a single layer structure of a rectangular shape in its section in a thickness direction. That is, the bus bar connection part 97 before the hot press is not required to be provided with the end face recess 65 (see FIG. 9A) for receiving the side edge 67 of the bus bar 99. Thus the bus bar connection part can be configured to have simple structure. By doing so, as the bus bar connection part 97 can be configured to have the simple structure, a cost of components can be reduced.

Further, the bus bar connection part 97 is subjected to the hot press from the one surface side thereof against the side edge 67 of the bus bar 99. Thus, when the bus bar connection part 97 is welded to the side edge 67 of the bus bar 99 by the hot press, air is prevented from being sealed within the through hole 101 by the softened resin. As a result, there does not arise such a phenomenon that air is filled in the through hole 101 to thereby prevent the softened resin flowing into the through hole 101.

Thus, according to the battery wiring modules 11, 13, 61, 83 and 95 according to the respective embodiments, wiring to the respective battery cells 17 can be performed easily with the simple configuration, and also versatility can be improved and a manufacturing cost can be reduced Herein the features of the battery wiring module according to the embodiments of the invention will be briefly summarized and listed below

[1] A battery wiring module (11, 13, 61) to be combined with a battery module (19) including a plurality of battery cells (17) stacked in a state of being alternatively reversed so that a positive electrode terminal (31) and a negative electrode terminal (33) are adjoined between the adjacent battery cells, the battery wiring module comprising:

a plurality of linear conductors (43) which are arranged at an interval;

a plurality of bus bars (23, 25) which are arranged in parallel at an interval along to at least one side of the plurality of linear conductors (43) so that each of the plurality of bus bars electrically connects the positive electrode terminal (31) and the negative electrode terminal (33) adjacent to each other; and an insulation resin part (45) including both a covering part (62) for covering an outer periphery of the plurality of linear conductors (43) and a bus bar connection part (63), wherein the bus bar connection part is hot pressed so as to cover at least a part of each of through holes (69) formed in side edges (67) of the plurality of bus bars (23, 25), wherein the side edges are adjacent to the plurality of linear conductors (43), and wherein each of the plurality of linear conductors (43) is electrically connected to predetermined one of the plurality of bus bars (23, 25).

[2] The battery wiring module (11, 13, 61) according to [1], wherein the bus bar connection part (63) is hot pressed from both flat surface sides toward the side edges (67) of the bus bars (23, 25).

[3] The battery wiring module (11, 13, 61) according to [1] or [2], wherein the bus bar connection part (63) is hot pressed so as to cover a part of each of the through holes (69).

[4] The battery wiring module (11, 13, 61) according to [1] or [2], wherein each of the through holes (87) includes a communication part (85) communicating with an edge (91) of the bus bar (89).

[5] The battery wiring module (11, 13, 61) according to [1], wherein the bus bar connection part (97) is hot pressed from one flat surface side toward the side edges (67) of the bus bars (99).

Incidentally, the invention is not limited to the aforesaid embodiments but suitable changes, improvements, and so on may be performed. The material, shapes, sizes, numbers, arrangement positions, etc. of the respective constituent elements in the aforesaid embodiments may be optional ones and not limited to particular ones so long as the invention is achieved.

For example, the insulation resin part may be formed in a manner that both the outer periphery of the plurality of linear conductors and the side edges of the plurality of bus bars adjacent to the plurality of linear conductors are sandwiched between two insulation sheets, and both the insulation sheets are subjected to the hot press.

DESCRIPTION OF THE REFERENCE NUMERALS AND SIGNS 11, 13, 61, 83, 95 battery wiring module
17 battery cell 19 battery module
23 bus bar
25 bus bar
31 positive electrode terminal
33 negative electrode terminal
43 linear conductor
45 insulation resin part
62 covering part
63 bus bar connection part
67 side edge
69 through hole

What is claimed is:

1. A battery wiring module to be combined with a battery module including a plurality of battery cells stacked in a state of being alternatively reversed so that a positive electrode terminal and a negative electrode terminal are adjoined between the adjacent battery cells, the battery wiring module comprising:
a plurality of linear conductors which are arranged at an interval;
a plurality of bus bars which are arranged in parallel with the plurality of linear conductors and arranged at an interval along to at least one side of the plurality of linear conductors so that each of the plurality of bus bars electrically connects the positive electrode terminal and the negative electrode terminal adjacent to each other; and
an insulation resin part including both a covering part for covering an outer periphery of the plurality of linear conductors and a bus bar connection part,
wherein the bus bar connection part covers at least a part of each of through holes formed in side edges of the plurality of bus bars,
wherein the side edges are adjacent to the plurality of linear conductors, and
wherein each of the plurality of linear conductors is electrically connected to a respective one of the plurality of bus bars.

2. The battery wiring module according to claim 1, wherein the bus bar connection part is hot pressed from both flat surface sides toward the side edges of the bus bars.

3. The battery wiring module according to claim 1, wherein the bus bar connection part is hot pressed so as to cover a part of each of the through holes.

4. The battery wiring module according to claim 2, wherein the bus bar connection part is hot pressed so as to cover a part of each of the through holes.

5. The battery wiring module according to claim 1, wherein each of the through holes includes a communication part communicating with an edge of the bus bar.

6. The battery wiring module according to claim 2, wherein each of the through holes includes a communication part communicating with an edge of the bus bar.

7. The battery wiring module according to claim 1, wherein the bus bar connection part is hot pressed from one flat surface side toward the side edges of the bus bars.

8. The battery wiring module according to claim 1, wherein the bus bar connection part covers at least a part of each of the through holes on a side of the bus bar opposite the side of the bus bar contacting the plurality of battery cells.

9. The battery wiring module according to claim 1, wherein the bus bar connection part is hot pressed so as to fill at least a part of each of the through holes formed in the side edges of the plurality of bus bars.

* * * * *